Feb. 1, 1966 J. H. MITCHELL 3,232,255
MACHINE FOR PLANTING STOLONATE GRASSES
Filed July 22, 1963 3 Sheets-Sheet 1
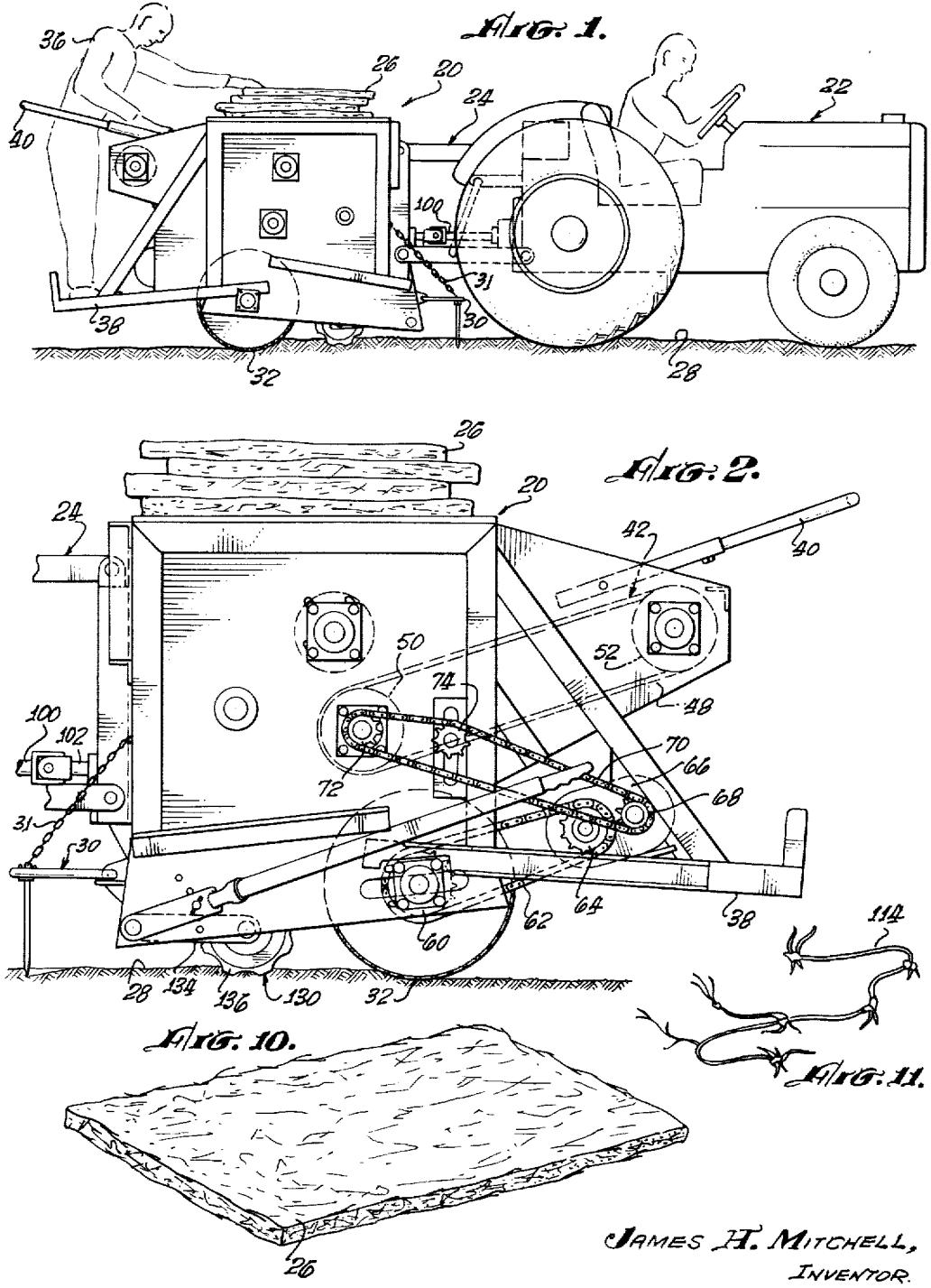
James H. Mitchell,
INVENTOR.
By His Attorneys
Harris, Kiech, Russell & Kern

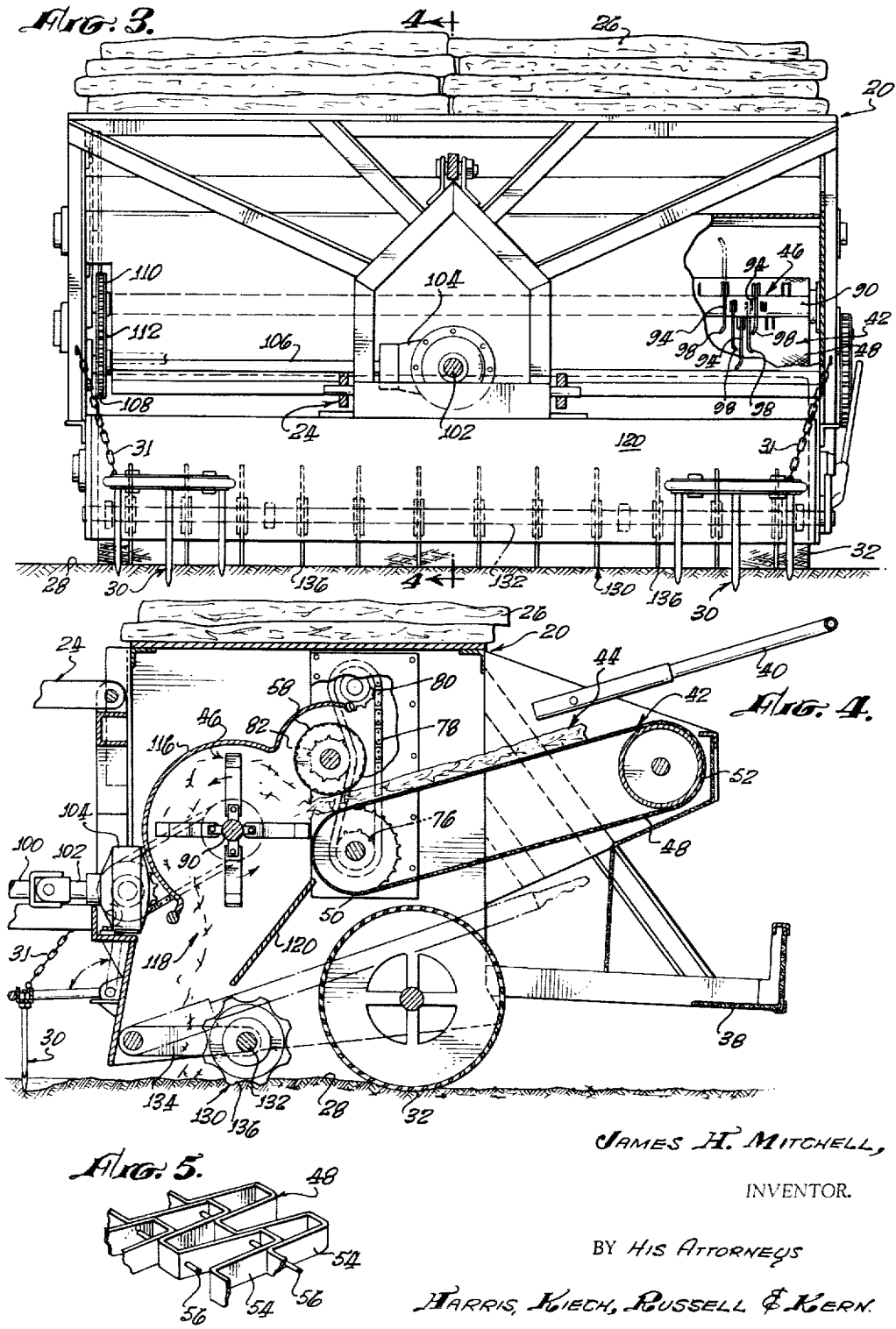

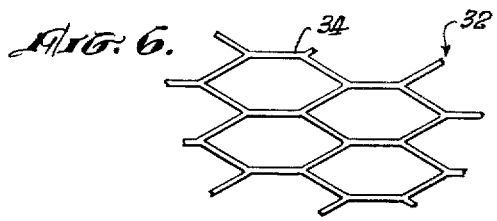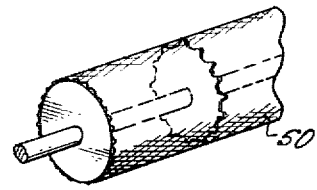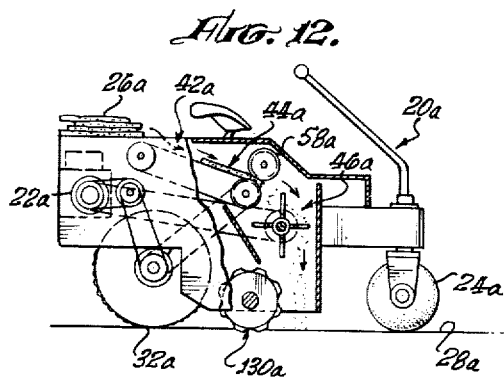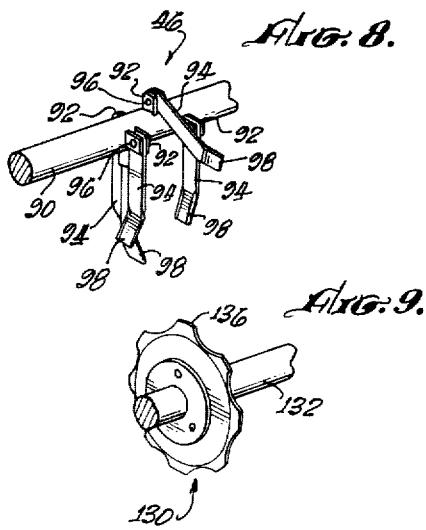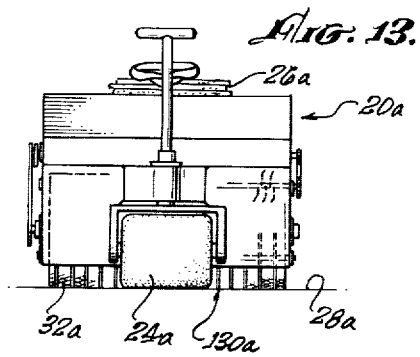

United States Patent Office 3,232,255
Patented Feb. 1, 1966

3,232,255
MACHINE FOR PLANTING STOLONATE GRASSES
James H. Mitchell, San Gabriel, Calif., assignor to Western Turfgrass, Inc., San Gabriel, Calif., a corporation of California
Filed July 22, 1963, Ser. No. 296,509
7 Claims. (Cl. 111—1)

The present invention relates in general to a method of and apparatus for planting stolonate grasses, i.e., stolon-producing grasses which can or must be propagated through the use of their stolons. Essentially, stolonized planting involves distributing stolons obtained from stolonate sod over the area to be planted and covering the stolons with soil, mulch, or the like, a general object of the invention being to provide an improved method and apparatus for propagating stolonate grasses in this manner.

An important advantage of planting lawns, golf courses, athletic fields, and the like, by the use of stolons is that the desired lawn or turf is established much more quickly than by the use of seeds, and at far less expense than sodding. Many types of grasses can be propagated by stolonizing, such as bents, bermudas, zoysias, St. Augustine grass, and the like. Moreover, many stolonate grasses, including various varieties of bents, bermudas and zoysias, can be propagated only by using their stolons since they either do not produce viable seeds, or they do not produce true to type from their seeds.

Basically, stolons are obtained by comminuting sod harvested from a field of the desired stolonate grass. Usually, this is done at a central plant, the stolons then being shipped to the desired planting site. The stolons are either shipped in bulk, or, in the case of small orders, in plastic bags. In either event, it is necessary to keep the stolons under refrigeration during storage, or prolonged shipment.

Despite refrigeration, stolons handled in the foregoing manner are subject to high mortality rates because heating by decomposition tends to start almost immediately. Mortality rates are also high because of dehydration.

In view of the foregoing, a primary object of the invention is to achieve maximum stolon germination by planting the stolons immediately after comminuting the stolonate sod, accomplishing this with an apparatus and method which involve comminuting the stolonate sod and immediately planting the resulting stolons while traversing a strip of a prepared surface to be planted. As a result of this procedure, stolon mortality due to decomposition heating and/or dehydration is reduced to an absolute minimum, which is an important feature of the invention.

Another important object of the invention is to obtain an extremely uniform stand of grass by uniformly broadcasting the stolons, immediately after comminution of the stolonate sod, directly on a strip of the prepared surface while proceeding lengthwise along such strip. In other words, the stolons are broadcast uniformly across the entire width of the strip, and directly on the prepared surface, while proceeding lengthwise along the strip. Immediately thereafter, the stolons thus deposited on the prepared surface are worked into the ground so as to at least partially cover them, again while proceeding lengthwise along the strip being planted.

The foregoing procedure of comminuting the stolonate sod, immediately and uniformly depositing the stolons directly on the prepared surface, and immediately thereafter working the stolons into the ground, achieves several important results. First, high germination of the stolons is achieved since mortality from decomposition heating and/or dehydration is minimized. Secondly, an extremely uniform stand of grass is achieved, as opposed to planting stolons in furrows, for example.

Another important object of the invention is to work the stolons, which have been deposited or broadcast directly on the prepared surface, into the ground by a slicing action. More particularly, an object in this connection is to work the stolons into the ground with coulter blades spaced apart transversely of the path of movement of the machine along the strip being planted.

Still another important object of the invention is to compact the prepared surface after the stolons have been sliced into the ground by the coulter blades, and to further work the stolons into the ground, by means of a screen-like roller extending transversely of the machine rearwardly of the coulter blades. The screen-like roller, which may be made of expanded metal, produces a waffle-like pattern, the portions of the roller forming the depressed portions of such pattern further working the stolons into the ground.

Yet another important object of the invention is to provide a sod shredding and stolon planting machine which includes means for feeding stolonate sod to a comminuting means at a rate proportional to the speed of movement of the machine so as to broadcast stolons uniformly over the strip being traversed by the machine despite variations in the ground speed of the machine, and which may be readily and easily changed in the field from one planting rate to another.

Another object of the invention is to provide a machine having means for feeding the stolonate sod to the comminuting means edgewise, whereby the comminuting means shreds the edge of the sod presented thereto to achieve controlled comminution.

Another object is to provide conveyor means for feeding the sod edgewise to the comminuting means in a controlled manner, comprising an endless conveyor on which the sod is placed and a roller engaging the opposite side of the sod adjacent the comminuting means so that the edge of the sod which is being shredded by the comminuting means is firmly held in place by the endless conveyor and the roller mentioned. Another object in this connection is to provide an endless conveyor which is perforated so that soil attached to the sod may fall therethrough to avoid interfering with the operation of the conveyor means.

In order to insure even distribution of stolons across the strip being traversed by the machine, the comminuting means preferably extends transversely of the machine and the edgewise-presented sod is fed to the comminuting means longitudinally of the machine, which is another object of the invention.

Still another object of the invention is to provide a comminuting means including a rotary shaft extending transversely across the frame of the machine, and including shredding blades pivotally connected to the shaft by pivots parallel to and spaced radially outwardly from the shaft. Thus, if the shredding blades encounter any obstructions, they are free to pivot to avoid damage to the machine.

Still another object is to provide shredding blades spirally arranged around the shaft and to provide adjacent blades with sharpened ends axially offset in opposite directions. With this construction, uniform shredding of the sod into stolons having the desired numbers of nodes is achieved.

The foregoing objects, advantages, features and results of the present invention, together with various other objects, advantages, features and results thereof which will be evident to those skilled in the art of stolon propagation, may be achieved with the exemplary embodiments of the invention described in detail hereinafter and illustrated in the accompanying drawings, in which:

FIG. 1 is a side elevational view on a reduced scale of a tractor-drawn sod shredding and stolon planting machine of the invention;

FIG. 2 is an enlarged view of the opposite side of the machine from that shown in FIG. 1;

FIG. 3 is a front elevational view of the machine, with parts broken away to reveal interior details;

FIG. 4 is a sectional view taken along the arrowed line 4—4 of FIG. 3;

FIG. 5, 6, 7, 8 and 9 are fragmentary perspective views of various parts of the machine which will be identified hereinafter;

FIG. 10 is a perspective view of stolonate sod to be processed by the machine;

FIG. 11 is a perspective view of a typical stolon;

FIG. 12 is a side elevational view, partially in section, of an alternative machine of the invention; and FIG. 13 is a front elevational view of the machine of FIG. 12.

Referring initially to FIG. 1 of the drawings, one embodiment of the machine of the invention is designated generally therein by the numeral 20 and is shown as being of the tractor-drawn type, being connected to a tractor 22 by the usual three-point hitch 24. As is well known, this hitch may be utilized to lift the machine 20 clear of the ground in making U-turns at opposite ends of an area being planted, or for transport purposes.

As hereinbefore outlined, the machine 20 is designed to shred pieces of sod 26 into discrete stolons and to broadcast the comminuted sod directly onto a prepared surface 28 during repeated traverses across or around an area to be planted. Since the tires of the tractor 22 tend to compact the prepared surface 28 ahead of the machine 20, the machine is preferably provided at the front thereof with two small harrows 30, located directly behind the tractor tires, for loosening the soil compacted by the tires. As suggested in FIG. 4 of the drawings, the harrows 30, each of which is shown as having three teeth, may be pivoted upwardly and rearwardly into inoperative positions when not in use. They are also prevented from being buried too deeply, or from "digging in," by means of chain stops 31.

Suitably mounted on the frame of the machine 20 adjacent the rear of the machine is a supporting roller 32 which, as will be described in more detail hereinafter, also serves to compact the surface 28 after planting and which further serves to assist in working the planted stolons into the ground. For this purpose, as shown in FIG. 6, the supporting roller 32 is formed with a screen-like ground-engaging surface 34 which produces a waffle-like pattern as it rolls over the planted surface ahead of it. Preferably, the screen-like surface 34 of the supporting roller 32 is made of expanded metal.

The sod shredding and stolon planting machine 20 is adapted to be supplied with sod pieces 26 by an operator 36 standing on a platform 38 and within a guard rail 40 at the rear of the machine. A supply of the sod pieces 26 sufficient for one or more traverses across or around the area to be planted may be stacked on top of the machine 20, as shown in FIGS. 1 to 4 of the drawings. (Typically, each piece of sod may have dimensions of the order of one foot by six feet, and may have a thickness of the order of one inch or so. However, these dimensions are not critical. It will be understod that the sod pieces 26 may be watered as may be required to maintain them at maximum freshness between harvesting and loading on the machine 20.)

Referring particularly to FIG. 4 of the drawings, just forwardly of the operator's platform 38 is a longitudinally extending and downwardly and forwardly inclined conveyor means 42 on which the operator 36 constantly maintains a uniform sod blanket or sheet 44 by placing sod pieces 26 thereon as required. As described in more detail hereinafter, the conveyor means 42 feeds the sod blanket 44 to a comminuting means 46 edgewise at a rate proportional to the forward speed of the machine 20 along the strip it is planting.

Considering the conveyor means 42 in more detail, it includes an endless conveyor 48 which extends longitudinally of the machine 20, and which is inclined downwardly and forwardly toward the comminuting means 46 so that gravity assists in feeding the sod blanket 44 to the comminuting means. The endless conveyor 48 is trained around rollers 50 and 52, the roller 50 being driven at a speed proportional to the ground speed of the machine 20 in a manner to be described. As shown fragmentarily in FIG. 5 of the drawings, the endless conveyor 48 is a foraminous conveyor which meshes with sprocket teeth, FIG. 7, on the roller 50, and which permits any dirt becoming detached from the sod pieces 26 to drop through onto the ground. This prevents jamming of dirt between the endless conveyor 48 and the rollers 50 and 52. As shown in FIG. 5, the endless conveyor 48 may include transversely extending, zigzag strips 54 which are nested together and pivotally interconnected by transverse rods 56.

The conveyor means 42 also includes a pressure roller 58 which extends transversely of and is suitably mounted on the frame of the machine 20, and which engages the upper surface of the sod blanket 44 opposite the roller 50 and immediately adjacent the comminuting means 46. This insures that the edge of the sod blanket 44 which is being shredded by the comminuting means 46 is held firmly in place to achive uniform shredding into discrete stolons, as will be described in more detail hereinafter.

As previously mentioned, the sod blanket 44 is fed to the comminuting means 46 edgewise at a rate proportional to the ground speed of the machine 20 to assure even stolon distribution over the strip being planted despite variations in the ground speed of the machine. This is accomplished by driving the endless conveyor 48 and the pressure roller 58 from the main supporting roller 32 in a manner which will now be described.

The main supporting roller 32 has fixedly connected thereto a sprocket 60, FIG. 2, which, through an endless chain 62, drives an input sprocket 64 of a gear box 66. The latter is provided with an output sprocket 68 which, through an endless chain 70, drives a sprocket 72 fixedly connected to one end of the driving roller 50 for the endless conveyor 48. An adjustable idler sprocket 74 is provided to adjust the tension in the chain 70. Referring to FIG. 4, the opposite end of the conveyor roller 50 has connected thereto a sprocket 76 which drives an endless chain 78 trained around an idler sprocket 80 and over a sprocket 82 connected to the pressure roller 58. The chain 78 is so trained over the sprockets 76, 80 and 82 that it drives the pressure roller 58 in a direction opposite to the direction of rotation of the conveyor roller 50. Thus, the endless conveyor 48 and the pressure roller 58 both act to feed the sod blanket 44 toward the comminuting means 46.

With the foregoing drive for the endless conveyor 48 and the pressure roller 58, the sod blanket 44 is advanced edgewise toward the comminuting means 46 at a rate directly proportional to the ground speed of the machine 20 along the strip being planted. Thus, stolon distribution independent of ground speed is assured, which is an important feature. Furthermore, with the system disclosed, the rate at which the sod blanket 44 is fed to the comminuting means 46 for a particular ground speed may be changed readily by changing the diameter of the sprocket 68, for example. Thus, the density with which stolons are distributed over the strip being planted may be increased or decreased as desired, which is an important feature.

Turning to a consideration of the comminuting means 46, it includes a rotary shaft 90 extending transversely across and suitably supported by the frame of the machine 20, being in line with the path of movement of the sod blanket 44 toward the comminuting means. The shaft 90 has secured thereto a plurality of pivot brackets 92, best shown in FIG. 8, which are arranged spirally of the shaft. In other words, each bracket 92 is spaced from the adjacent bracket both axially and circumferentially, the circumferential spacing between brackets being 90° in the particular construction shown. The comminuting means 46 also includes shredding blades 94 having their inner ends connected to the respective brackets 92 by pivots 96 parallel to and spaced radially outwardly from the shaft 90. As will be apparent, the shredding blades 94 assume radial positions under the influence of centrifugal force as the shaft 90 rotates, but are free to yield pivotally when encountering any obstruction, thereby minimizing any possibility of damage to the machine 20.

As shown in FIGS. 3 and 8 of the drawings, the blades 94 have ends 98 adjacent ones of which are laterally offset, i.e., offset transversely of the machine 20, in opposite directions. Thus, one pair of adjacent blades 94 will have its ends 98 offset laterally toward each other, while the next pair will have its ends offset laterally away from each other. Preferably, both edges of the laterally offset blade ends 98 are sharpened.

As suggested by FIG. 3 of the drawings, the foregoing construction of the comminuting means 46 causes the sharpened, offset ends 98 of the blades 94 to shreddingly engage the advancing edge of the sod blanket 44 at angles to the path of the sod blanket and at uniformly transversely spaced points, thereby shredding the sod blanket into discrete stolons very uniformly. To achieve an adequately high speed for the comminuting means 46, and to insure an uninterrupted drive therefor, the shaft 90 of the comminuting means is preferably driven by the power take-off 100 with which the tractor 22 is conventionally provided. The power take-off 100 drives an input shaft 102 of a gear box 104 of the machine 20, the gear box having a transverse output shaft 106 which carries a pulley 108 driving a pulley 110 on the shaft 90 through an endless belt 112, as best shown in FIGS. 3 and 4 of the drawings.

With the particular construction for the comminuting means 46 which has been illustrated and described, the rotary speed of the comminuting-means shaft 90 should be of the order of 1200 to 1600 revolutions per minute. This rotational speed, with the construction disclosed, produces stolons having several nodes, as illustrated by the stolon 114 shown in FIG. 11 of the drawings. Several nodes per stolon are desirable since this insures maximum germination.

The direction of rotation of the comminuting means 46 is preferably such that the shredding blades 94 slice upwardly through the advancing edge of the edgewise-presented sod blanket 44, as shown in FIG. 4 of the drawings. The comminuted sod blanket, including discrete stolons, leaves, dirt, and the like, are deflected by an arcuate guard or shield 116, which partially surrounds the comminuting means 46, downwardly to an outlet or discharge opening 118 which is transversely coextensive with the conveyor means 42 and the comminuting means 46. The discharge opening 118 has its forward edge defined by one edge of the arcuate guard 116, and has its rearward edge defined by a transverse deflector plate 120 which prevents the comminuted material from falling against the screen-like supporting and compacting roller 32. This structure thus serves as a means for uniformly depositing or broadcasting the comminuted sod, including the discrete stolons contained therein, directly on the prepared planting surface 28, such depositing taking place at a point somewhat forwardly of the main supporting and compacting roller 32.

Carried by the frame of the machine 20 rearwardly of the transverse zone in which the comminuted sod is uniformly deposited directly on the prepared planting surface 28, but forwardly of the supporting and compacting roller 32, is a transversely extending means 130 for working, or, more specifically, slicing, the uniformly broadcast stolons, and other comminuted material, into the ground. The means 130 for working the stolons into the ground comprises a transverse shaft 132 connected at its ends to the rearward ends of trailing arms 134 pivotally connected to the frame of the machine 20 at their forward ends. With this construction, the means 130 for working the stolons into the ground can rise and fall with any minor irregularities in the planting surface 28. Alternatively, it can be locked into a fixed position in reference to the other features of the machine.

Mounted on the shaft 132 are transversely spaced coulter blades 136 having relatively dull circumferential edges which are preferably serated or scalloped as shown. The coulter blades 136 score the planting surface 28, and press the stolons, and other comminuted material, into the preapred planting surface 28 with what may best be described as a slicing action. However, it will be understood that the coulter blades 136 are not sharp enough to actually cut stolons they encounter in two in most instances, the sole object being to press the stolons downwardly into soil at least partially so that some or all nodes thereon are covered.

The main supoprting and compacting roller 32, which follows the coulter blades 136, further presses the stolons into the soil, and compacts the soil around the buried nodes of the stolons to insure proper germination. With the construction disclosed, a very high germination percentage, of the order of 95% can be achieved.

It is throught that the over-all operation of the sod shredding and stolon planting machine 20 will be apparent from the foregoing so that only a brief summation is necessary. As previously indicated, comminuting the sod pieces 26 into stolons immediately prior to planting insures stolons in top condition and unaffected by decomposition heating and/or dehydration. In other words, there is enough soil present in the sod pieces to minimize decomposition heating and to minimize dehydration, the latter being further minimized by watering the sod pieces as required between harvesting and comminution. The edgewise presentation of the sod blanket 44 to the comminuting means 46, and the particular disclosed structure of the comminuting means, insure accurate shredding of the sod into discrete stolons of uniform size. The stolons are then uniformly broadcast on the prepared planting surface 28 and are immediately worked into the ground by the coulter blades 136 and the compacting roller 32. The comminuting, broadcasting and covering steps all occur so rapidly that no significant dehydration of the stolons can occur. Further, broadcasting the stolons directly onto the planting surface, and then working them in with the combined slicing and compacting action described, insures a completely uniform stand of grass after germination. Immediately after planting of an area has been completed, the area is prefrably watered to minimize any possibility of post-planting dehydration of the stolons.

As previously disclosed, the rod shredding and stolon planting machine 20 is designed to be drawn by the tractor 22, being particularly intended for large area planting, such as golf courses, athletic fields, and the like. Smaller areas, such as lawns, greens, and the like, may conveniently be planted by a smaller, self-propelled machine 20a, FIGS. 12 and 13. The self-propelled machine 20a is shown as powered by a gasoline engine 22a driving a main supporting and compacting roller 32a corresponding to the supporting and compacting roller 32. The machine 20a is provided at the front thereof with a steerable supporting roller 24a.

The self-propelled machine 20a, which is intended for one-man operation, is basically similar to the machine 20 so that only the general components thereof will be pointed out, using reference characters differing from those employed in connection with the corresponding components of the machine 20 by the addition of the suffix a. Thus, the machine 20a includes a conveyor means 42a for longitudinally feeding a sod blanket 44a edgewise to a comminuting means 46a which broadcasts the comminuted sod directly onto a prepared planting surface 28a in front of a means 130a for working the comminuted sod into the planting surface ahead of and for compaction by the roller 32a. The gasoline engine 22a propels the machine 20a through a suitable driving connection to the main supporting and compacting roller 32a. The conveyor means 42a, including its pressure roller 58a, and the comminuting means 46a are driven by the engine 22a through suitable drive trains which need not be described specifically.

Although exemplary embodiments of the invention have been disclosed herein for purposes of illustration, it will be understood that various changes, modifications and substitutions may be incorporated in such embodiments without departing from the spirit of the invention as defined by the claims which follow:

1. In an apparatus for planting a prepared surface to stolonate grass, the combination of:
   (a) a frame;
   (b) means on said frame for supporting same for movement over the prepared surface;
   (c) comminuting means extending transversely across said frame for comminuting sheets of stolonate sod into discrete stolons;
   (d) means carried by said frame for feeding stolonate sod edgewise to said comminuting means, said means comprising a moving conveyor terminating at a point immediately adjacent said comminuting means and cooperating with roller means closely spaced above said point for positively feeding said sod between said conveyor and said roller while holding the leading end portion of said sod firmly in place as it is being fed to said comminuting means;
   (e) means carried by and extending transversely of said frame for broadcasting the comminuted stolonate sod on and uniformly across the entire width of a strip of the prepared surface; and
   (f) means on said frame for covering with earth the comminuted sod thus broadcast on the prepared surface.

2. In an apparatus for planting a prepared surface to stolonate grass, the combination of:
   (a) a frame;
   (b) means on said frame for supporting same for movement over the prepared surface;
   (c) comminuting means extending transversely across said frame for comminuting sheets of stolonate sod into discrete stolons;
   (d) feeding means carried by said frame for feeding stolonate sod edgewise to said comminuting means at a rate proportional to the speed of movement of said frame;
   (e) said feeding means including moving conveyor means extending longitudinally of said frame for supporting stolonate sod in a flat condition for edgewise presentation to said comminuting means and terminating at a point immediately adjacent said comminuting means;
   (f) said feeding means further including roller means closely spaced above said point for pressing the stolonate sod against said conveyor means adjacent said comminuting means to thereby hold the leading end portion of said sod firmly in place as it is being positively fed to said comminuting means;
   (g) means carried by said frame for depositing the comminuted stolonate sod on the prepared surface; and
   (h) means on said frame for covering with earth the comminuted sod thus deposited on the prepared surface.

3. In an apparatus for planting a prepared surface to stolonate grass, the combination of:
   (a) a frame;
   (b) means on said frame for supporting same for movement over the prepared surface;
   (c) comminuting means, comprising a shaft extending transversely across said frame and carrying pivoted shredding blades, for comminuting sheets of stolonate sod into discrete stolons;
   (d) feeding means carried by said frame for feeding stolonate sod edgewise to said comminuting means at a rate proportional to the speed of movement of said frame;
   (e) said feeding means including moving conveyor means extending longitudinally of said frame for supporting stolonate sod in a flat condition for edgewise presentation to said comminuting means and terminating at a point immediately adjacent said comminuting means;
   (f) said feeding means further including roller means closely spaced above said point for pressing the stolonate sod against said conveyor means adjacent said comminuting means to thereby hold the leading end portion of said sod firmly in place as it is being positively fed to said comminuting means;
   (g) means carried by said frame for depositing the comminuted stolonate sod on the prepared surface; and
   (h) means on said frame for covering with earth the comminuted sod thus deposited on the prepared surface.

4. In an apparatus for planting a prepared surface to stolonate grass, the combination of:
   (a) a frame;
   (b) means on said frame for supporting same for movement over the prepared surface;
   (c) comminuting means carried by said frame for comminuting sheets of stolonate sod into discrete stolons;
   (d) said comminuting means including a rotary shaft extending transversely across said frame;
   (e) said comminuting means also including shredding blades pivotally connected to said shaft by pivots parallel to and spaced radially outwardly from said shaft;
   (f) feeding means carried by said frame for feeding stolonate sod edgewise to said comminuting means;
   (g) said feeding means including moving conveyor means extending longitudinally of said frame for supporting stolonate sod in a flat condition for edgewise presentation to said comminuting means and terminating at a point immediately adjacent said comminuting means;
   (h) said feeding means further including roller means closely spaced above said point for pressing the stolonate sod against said conveyor means adjacent said comminuting means to thereby hold the leading end portion of said sod firmly in place as it is being positively fed to said comminuting means;
   (i) means carried by said frame for depositing the comminuted stolonate sod on the prepared surface; and
   (j) means on said frame for covering with earth the comminuted sod thus deposited on the prepared surface.

5. In an apparatus for planting a prepared surface to stolonate grass, the combination of:
   (a) a frame;
   (b) means on said frame for supporting same for movement over the prepared surface;
   (c) comminuting means carried by said frame for comminuting sheets of stolonate sod into discrete stolons;
   (d) said comminuting means including a rotary shaft extending transversely across said frame;

(e) said comminuting means also including shredding blades spirally arranged around said shaft and pivotally connected to said shaft by pivots parallel to and spaced radially outwardly from said shaft;

(f) adjacent blades having sharpened ends axially offset in opposite directions;

(g) feeding means carried by said frame for feeding stolonate sod edgewise to said comminuting means;

(h) said feeding means including moving conveyor means extending longitudinally of said frame for supporting stolonate sod in a flat condition for edgewise presentation to said comminuting means and terminating at a point immediately adjacent said comminuting means;

(i) said feeding means further including roller means closely spaced above said point for pressing the stolonate sod against said conveyor means adjacent said comminuting means to thereby hold the leading end portion of said sod firmly in place as it is being positively fed to said comminuting means;

(j) means carried by said frame for depositing the comminuted stolonate sod on the prepared surface; and (k) means on said frame for covering with earth the comminuted sod thus deposited on the prepared surface.

6. In combination:
(a) a frame;
(b) comminuting means carried by said frame for comminuting sheets of stolonate sod into discrete stolons;
(c) said comminuting means including a rotary shaft extending transversely across said frame;
(d) said comminuting means also including shredding blades spirally arranged around said shaft and pivotally connected to said shaft by pivots parallel to and spaced radially outwardly from said shaft;
(e) adjacent blades having sharpened ends axially offset in opposite directions; and
(f) feeding means carried by said frame for feeding stolonate sod edgewise to said comminuting means, said means comprising a moving conveyor terminating at a point immediately adjacent said comminuting means and cooperating with roller means closely spaced above said point for positively feeding said sod between said conveyor and said roller while holding the leading end portion of said sod firmly in place as it is being fed to said comminuting means.

7. In an apparatus for planting a prepared surface to stolonate grass, the combination of:
(a) a frame;
(b) means on said frame for supporting same for movement over the prepared surface;
(c) comminuting means extending transversely across said frame for comminuting sheets of stolonate sod into discrete stolons;
(d) conveyor means carried by said frame, and including a foraminous endless conveyor, for feeding stolonate sod edgewise to said comminuting means, said conveyor means comprising a moving conveyor terminating at a point immediately adjacent said comminuting means and cooperating with roller means closely spaced above said point for positively feeding said sod between said conveyor and said roller while holding the leading end portion of said sod firmly in place as it is being fed to said comminuting means;
(e) means carried by and extending transversely of said frame for broadcasting the comminuted stolonate sod on and uniformly across the entire width of a strip of the prepared surface; and
(f) means on said frame for covering with earth the comminuted sod thus broadcast on the prepared surface.

References Cited by the Examiner
UNITED STATES PATENTS

| | | | |
|---|---|---|---|
| 1,500,437 | 7/1924 | Burton | 111—10 |
| 1,592,250 | 7/1926 | Yerkes | 111—1 |
| 2,514,890 | 7/1950 | McLemore | 47—58 |
| 2,713,835 | 7/1955 | Pittman | 111—1 |
| 2,715,882 | 8/1955 | Overstreet | 111—3 |
| 2,730,054 | 1/1956 | McDonald | 11—10 |
| 2,842,899 | 7/1958 | Padrick | 47—58 |
| 2,965,053 | 12/1960 | Gruber | 111—10 |
| 3,027,702 | 4/1962 | Phares | 172—45 X |

OTHER REFERENCES

Ser. No. 141,804, Abstract, 648 O.G. 950, pub. July 1951, Browning et al.

ABRAHAM G. STONE, *Primary Examiner.*

WILLIAM A. SMITH III, *Examiner.*